United States Patent
Sando et al.

(10) Patent No.: US 12,495,212 B2
(45) Date of Patent: Dec. 9, 2025

(54) IMAGE CAPTURING APPARATUS, IMAGE CAPTURING METHOD, AND STORAGE MEDIUM WITH EXPOSURE CONTROL

(71) Applicant: CANON KABUSHIKI KAISHA, Tokyo (JP)

(72) Inventors: Ryota Sando, Kanagawa (JP); Aihiko Numata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 18/443,556

(22) Filed: Feb. 16, 2024

(65) Prior Publication Data
US 2024/0292108 A1    Aug. 29, 2024

(30) Foreign Application Priority Data
Feb. 28, 2023    (JP) .................... 2023-029139

(51) Int. Cl.
    *H04N 23/73*    (2023.01)
    *H04N 23/60*    (2023.01)
    *H04N 25/79*    (2023.01)

(52) U.S. Cl.
    CPC .......... *H04N 23/73* (2023.01); *H04N 23/665* (2023.01); *H04N 25/79* (2023.01)

(58) Field of Classification Search
    CPC ...... H04N 23/73; H04N 23/665; H04N 25/79; H04N 25/50; H04N 25/773
    USPC ...................................................... 348/229.1
    See application file for complete search history.

(56) References Cited

U.S. PATENT DOCUMENTS

| | | | |
|---|---|---|---|
| 9,319,607 B2 | 4/2016 | Numata | |
| 9,402,041 B2 | 7/2016 | Numata | |
| 10,165,215 B2 | 12/2018 | Numata | |
| 10,469,774 B2 | 11/2019 | Kasuga et al. | |
| 2009/0185744 A1* | 7/2009 | Sanno | H04N 1/3872 382/173 |
| 2022/0006942 A1* | 1/2022 | Gnecchi | G06T 7/521 |
| 2023/0345148 A1* | 10/2023 | Mao | H04N 25/773 |
| 2024/0107192 A1 | 3/2024 | Numata | |
| 2024/0107199 A1 | 3/2024 | Numata | |

FOREIGN PATENT DOCUMENTS

JP    6573186 B2    9/2019

OTHER PUBLICATIONS

U.S. Appl. No. 18/418,763, filed Jan. 22, 2024 (First Named Inventor: Aihiko Numata).
U.S. Appl. No. 18/437,332, filed Feb. 9, 2024 (First Named Inventor: Suguru Hosono).
U.S. Appl. No. 18/437,342, filed Feb. 9, 2024 (First Named Inventor: Kan Takaiwa).

* cited by examiner

*Primary Examiner* — Usman A Khan
(74) *Attorney, Agent, or Firm* — Venable LLP

(57) ABSTRACT

An image capturing apparatus comprises a photoelectric conversion element configured to include an avalanche photodiode, a voltage control that controls the reverse bias voltage applied to the avalanche photodiode, and an exposure control that controls the exposure period of the photoelectric conversion element, wherein voltage control is configured to perform a change of the reverse bias voltage during a predetermined period other than the exposure periods in two consecutive frame periods, wherein the predetermined period is set by changing a blank period within two consecutive frame periods.

12 Claims, 12 Drawing Sheets

IMAGE CAPTURING APPARATUS, IMAGE CAPTURING METHOD, AND STORAGE MEDIUM WITH EXPOSURE CONTROL

BACKGROUND OF THE INVENTION

Field of the Invention

The present invention relates to an image capturing apparatus, an image capturing method, and a storage medium.

Description of the Related Art

Recently, a photoelectric conversion apparatus has been proposed that digitally counts the number of photons arriving at a Single Photon Avalanche Diode (SPAD) and outputs the counted value as a photoelectrically converted digital signal from a pixel.

When photons are incident on the SPAD in a state where a reverse bias voltage lower than the breakdown voltage has been applied, an avalanche amplification is generated, in which the photoelectrically converted electrons are amplified, and a large current flow is generated. By counting the number of these avalanche amplifications, it becomes possible to detect the number of photons.

Here, if the reverse bias voltage is too low, the SPAD is destroyed, whereas if the reverse bias voltage is too high, because photons can no longer be detected, control to an appropriate voltage is required.

For example, in Japanese Patent No. 6573186, an image capturing apparatus that changes the multiplication factor of an avalanche photodiode by changing the voltage applied to the avalanche photodiode between the end of a first exposure period and the start of a second exposure period is proposed.

However, in the image capturing apparatus disclosed in Japanese Patent No. 6573186, in a case in which the first exposure period of the avalanche photodiode is long and the time until the start of the second exposure period is short, the applied voltage change of the avalanche photodiode will change during the second exposure period. Therefore, the sensitivity of the avalanche photodiode changes, and there is a problem in which a step occurs in an image that is read out.

SUMMARY OF THE INVENTION

One aspect of the present invention is an image capturing apparatus comprising a photoelectric conversion element configured to include an avalanche photodiode, at least one processor; and a memory coupled to the at least one processor, the memory storing instructions that, when executed by the at least one processor, cause the at least one processor to perform voltage control that controls a reverse bias voltage applied to the avalanche photodiode, and exposure control that controls an exposure period of the photoelectric conversion element, wherein the voltage control is configured to perform a change of the reverse bias voltage during a predetermine period other than the exposure periods in two consecutive frame periods, wherein the predetermined period is set by changing a blank period within two consecutive frame periods.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
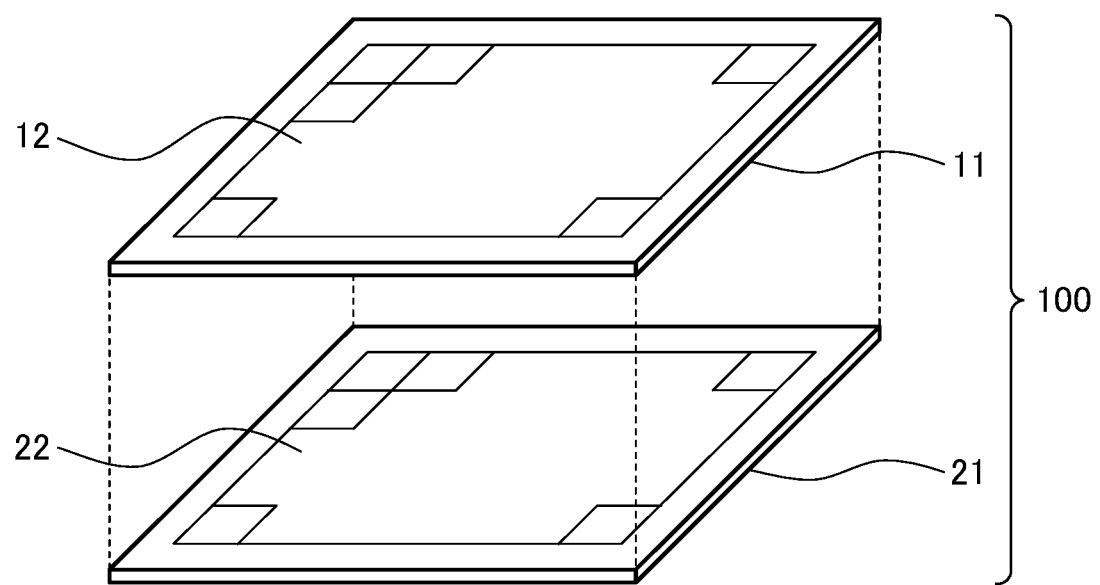
FIG. 1 is a diagram showing a configuration example of a photoelectric conversion element according to a First Embodiment.

FIG. 1 is a diagram showing a configuration example of a photoelectric conversion element according to a First Embodiment. As shown in FIG. 1, a photoelectric conversion element 100 of the First Embodiment is a photoelectric conversion element that is a so-called "stacked" structure, configured by two semiconductor substrates, a sensor substrate 11 and a circuit substrate 21, which are stacked and electrically connected.

However, the photoelectric conversion element may be a so-called "non-stacked" structure, wherein the configuration included in the sensor substrate and the configuration included in the circuit substrate are arranged in a common semiconductor layer. The sensor substrate 11 includes a pixel region 12. The circuit substrate 21 includes a circuit region 22 that processes signals detected in the pixel region 12.

Figure 2:
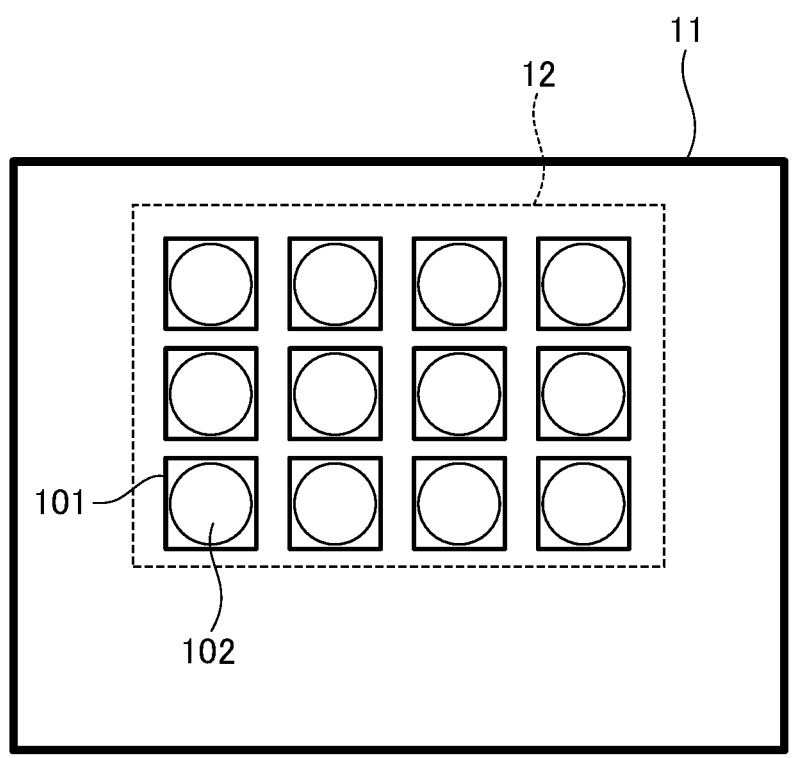
FIG. 2 is a diagram showing a configuration example of a sensor substrate according to the First Embodiment.

FIG. 2 is a diagram showing a configuration example of a sensor substrate according to the First Embodiment, wherein the pixel region 12 of the sensor substrate 11 includes pixels 101 that configure a plurality of rows and a plurality of columns by being two-dimensionally arranged. Each pixel 101 is provided with a photoelectric conversion unit 102 that includes an avalanche photodiode (APD). It should be noted that the number of rows and columns of the pixel array forming the pixel region 12 is not limited to the example shown in FIG. 2.

Figure 3:
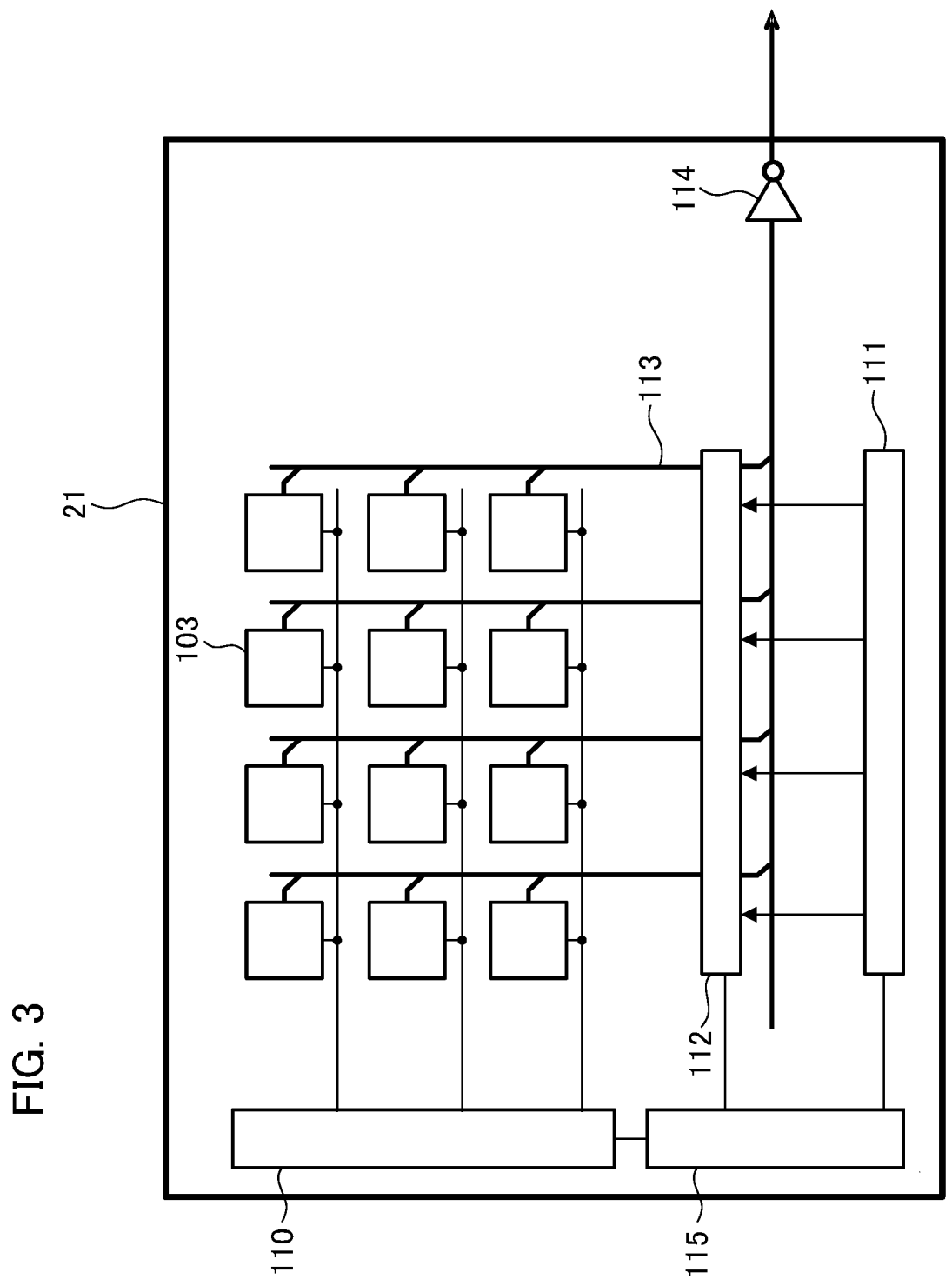
FIG. 3 is a diagram showing a configuration example of a circuit substrate according to the First Embodiment.

FIG. 3 is a diagram showing a configuration example of a circuit substrate according to the First Embodiment. The circuit substrate 21 includes signal processing circuits 103, each of which process the charges photoelectrically converted by the photoelectric conversion unit 102 shown in FIG. 2, a readout circuit 112, a control pulse generation unit 115, a horizontal scanning circuit unit 111, a signal line 113, and a vertical scanning circuit unit 110.

The vertical scanning circuit unit 110 receives control pulses supplied from the control pulse generation unit 115 and supplies control pulses to a plurality of pixels of each row. A logic circuit such as a shift register or an address decoder is used for the vertical scanning circuit unit 110.

The signal output from the photoelectric conversion unit 102 of each pixel is processed by a corresponding signal processing circuit 103. The signal processing unit 103 includes a counter and a memory, and a digital value is stored in the memory.

In order to read out a digital signal stored in the memory of each of the pixels 101, the horizontal scanning circuit unit 111 supplies a control pulse for sequentially selecting each column to the signal processing unit 103. A signal of the selected column is output to the signal line 113 from the signal processing circuit 103 of the pixel of the row selected by the vertical scanning circuit unit 110. A signal output to the signal line 113 is output to the outside of the photoelectric conversion element 100 via an output circuit 114.

As shown in FIG. 2 and FIG. 3, a plurality of signal processing circuits 103 are arranged under the plurality of pixel regions 12. Then, the vertical scanning circuit 110, the horizontal scanning circuit 111, the readout circuit 112, the output circuit 114, and the control pulse generator 115 are arranged under the region between the edge of the sensor substrate 11 and the pixel region 12.

In other words, the sensor substrate 11 includes the pixel region 12 and a non-pixel region arranged around the pixel region 12. Then, the vertical scanning circuit unit 110, the horizontal scanning circuit unit 111, the readout circuit 112, the output circuit 114, and the control pulse generation unit 115 are arranged under the non-pixel region.

It should be noted that the arrangement of the signal lines 113, the readout circuit 112, and the output circuit 114 are not limited to the example in FIG. 3. For example, the signal lines 113 may be arranged to extend in the row direction, and the readout circuit 112 may be arranged at the ends of the extended signal lines 113.

In addition, the function of the signal processing unit need not be provided for each of all photoelectric conversion elements, and a configuration in which one signal processing unit is shared by a plurality of photoelectric conversion elements and in which signal processing is performed sequentially is possible.

Figure 4:
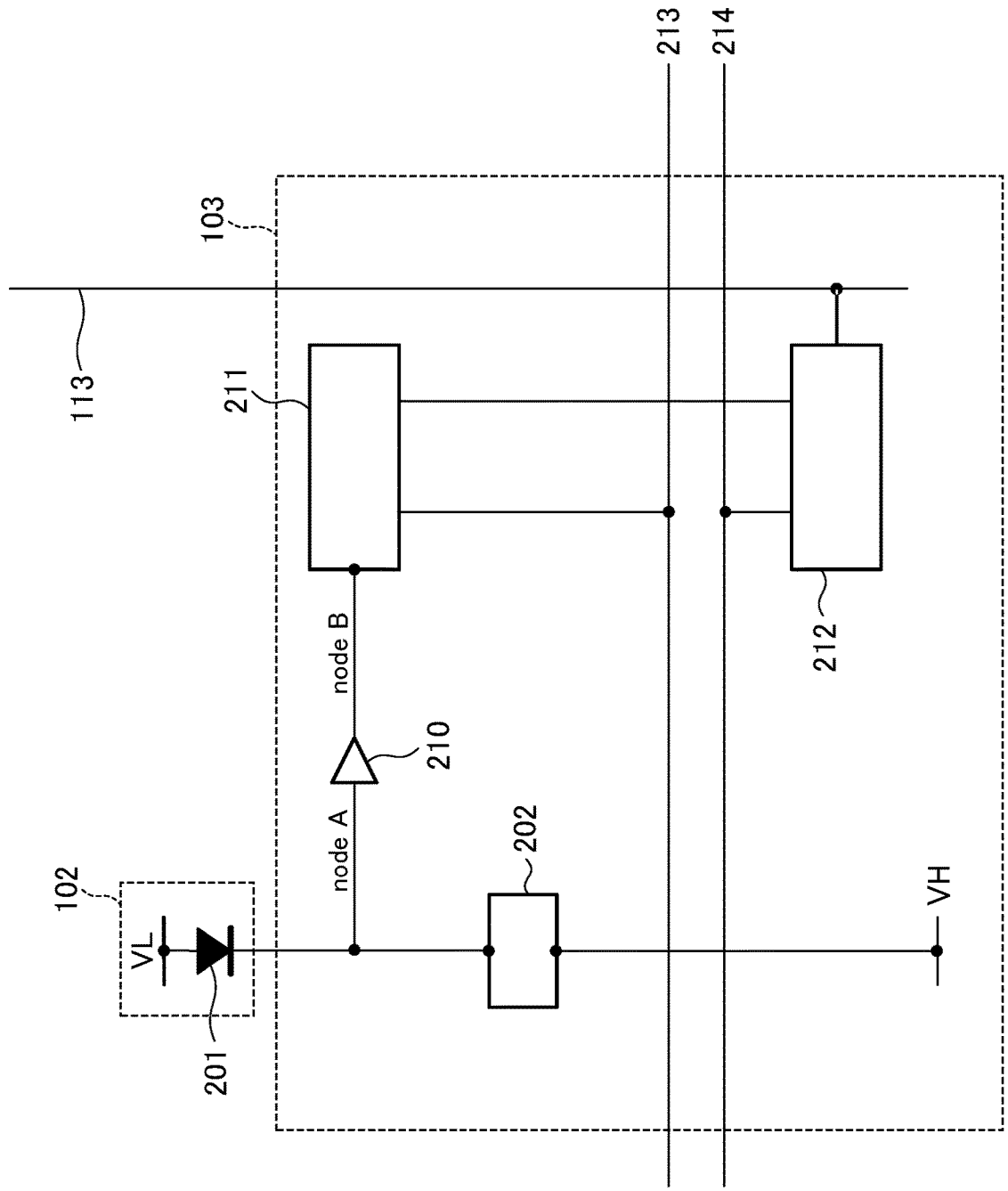
FIG. 4 is a diagram showing a configuration example of an equivalent circuit of a signal processing circuit corresponding to a pixel of the photoelectric conversion element according to the First Embodiment.

FIG. 4 is a diagram showing a configuration example of an equivalent circuit of a signal processing circuit corresponding to a pixel of the photoelectric conversion element according to the First Embodiment, and shows the equivalent circuit of the pixel 101 and the signal processing circuit 103 corresponding to the pixel 101.

The photoelectric conversion element 100 includes an avalanche photodiode (APD) 201, and the APD 201 generates charge pairs corresponding to incident light through photoelectric conversion. The anode of APD 201 is connected to a power line to which a drive voltage VL is supplied.

In addition, the cathode of the APD 201 is connected to a power supply line to which a drive voltage VH higher than the drive voltage VL is supplied via a quench element 202. The anode of the APD 201 is supplied with a reverse bias voltage (VR) such that the APD 201 performs an avalanche multiplication operation. Here, the voltage VR is determined by Equation 1.

$$VR = VL - VH \quad \text{(Equation 1)}$$

By supplying a voltage VR in such a state, the charge generated by the incident light undergoes avalanche multiplication, and an avalanche current is generated.

It should be noted that in a case in which a voltage VR is supplied, an APD operates in either Geiger mode, wherein the voltage difference between the anode and cathode is greater than the breakdown voltage, or in linear mode, wherein the voltage difference is near, or equal to or less than, the breakdown voltage. An APD operated in Geiger mode is referred to as a SPAD. In the case of a SPAD, the drive voltage VL is, for example, −30V, and the drive voltage VH is, for example, 1V.

The quench element 202 is connected to a power line configured to supply the drive voltage VH and to the cathode of the APD 201. The quench element 202 functions as a load circuit (quench circuit) during signal multiplication through avalanche multiplication, and performs a quench operation so as to suppress the voltage supplied to the APD 201 and suppress avalanche multiplication.

In addition, the quench element 202 performs a recharge operation by supplying a current equivalent to the voltage drop caused by the quench operation, thereby returning the voltage supplied to the APD 201 to the drive voltage VH.

The signal processing circuit 103 includes a waveform shaping unit 210, a counter circuit 211, and a selection circuit 212. Although FIG. 4 shows an example in which the signal processing circuit 103 includes the waveform shaping unit 210, the counter circuit 211, and the selection circuit 212, the signal processing circuit 103 need only include at least one of the waveform shaping unit 210, the counter circuit 211, and the selection circuit 212.

The waveform shaping unit 210 shapes the voltage change of the cathode of the APD 201 obtained at the time of photon detection into a pulse signal and outputs the pulse signal. For example, an inverter circuit is used as the waveform shaping unit 210. In FIG. 4, an example in which one inverter is used as the waveform shaping unit 210 is shown. However, a circuit that includes a plurality of inverters connected in series, or another circuit that has a waveform shaping effect, may also be used.

The counter circuit 211 counts the pulse signals that have been output from the waveform shaping unit 210 and holds the count value. In addition, when a control pulse RES is supplied via the drive line 213, the count value held in the counter circuit 211 is reset.

A control pulse SEL is supplied to the selection circuit 212 from the vertical scanning circuit unit 110 shown in FIG. 3, via a drive line 214 shown in FIG. 4 (not shown in FIG. 3). The selection circuit 212 includes, for example, a buffer circuit for outputting signals, and selectively outputs the output signals from the counter circuit 211 of the pixel to the signal line 113 in response to the control pulse SEL.

Although FIG. 4 shows an example of switching the output signal by the selection circuit 212, an electrical connection may also be switched by arranging a switch such as a transistor between the quench element 202 and the APD 201, or between the photoelectric conversion element 102 and the signal processing circuit 103. Similarly, the drive voltage VH or the drive voltage VL supplied to the photoelectric conversion element 102 can also be switched electrically by using a switch such as a transistor.

Figure 5:
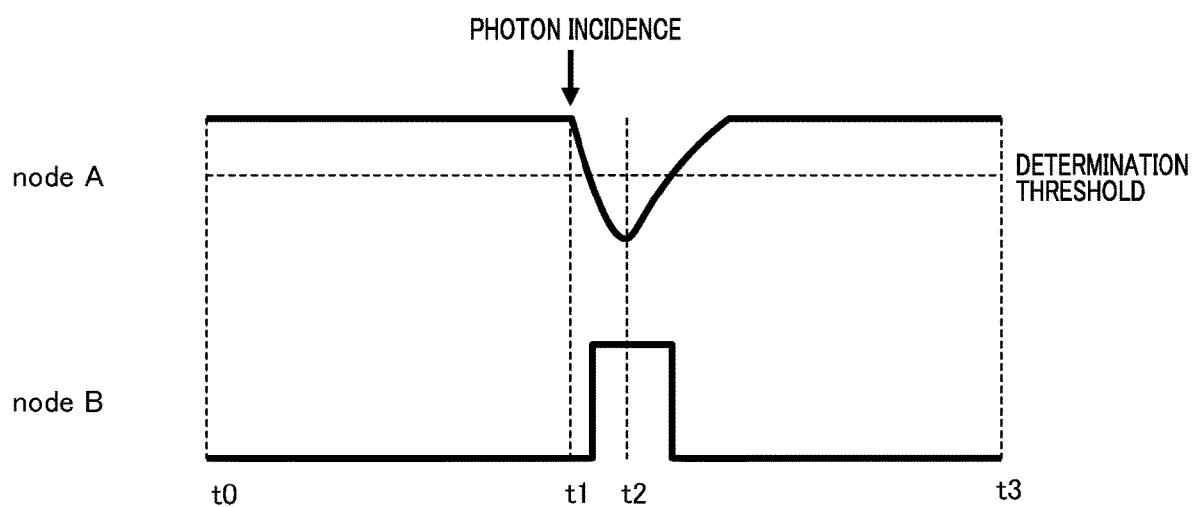
FIG. 5 is a schematic diagram showing a relationship between the operation of the APD 201 and an output signal according to the First Embodiment.

FIG. 5 is a schematic diagram showing a relationship between the operation of the APD 201 and an output signal according to the First Embodiment, wherein node A is the input side of the waveform shaping unit 210, and node B is the output side of the waveform shaping unit 210. During a period from time t0 to time t1, a potential difference of VH−VL is applied to the APD 201.

When photons are incident on the APD 201 at time t1, avalanche multiplication occurs in the APD 201 and an avalanche multiplication current flows to the quench element 202, and the voltage of node A drops.

When the voltage drop amount further increases and the potential difference applied to the APD 201 becomes smaller, as occurs at time t2, the avalanche multiplication of the APD 201 stops, and the voltage level of node A no longer drops below a certain value.

Thereafter, during a period from time t2 to time t3, a current that compensates for the voltage drop flows from the drive voltage VL to node A, and at time t3, node A becomes statically determinate at the original potential level. At this time, the portion of the output waveform at node A that falls below a certain determination threshold value is waveform-shaped by the waveform shaping unit 210, and is output as a pulse signal at node B.

In addition, because the breakdown voltage of the APD 201 has temperature dependency, it is desirable to set the reverse bias voltage (VR) in conjunction with the temperature. Thus, in the First Embodiment, the temperature of the photoelectric conversion element 100 is detected, and the reverse bias voltage (VR) is corrected so as to align with the temperature dependency of the breakdown voltage.

Figure 6:
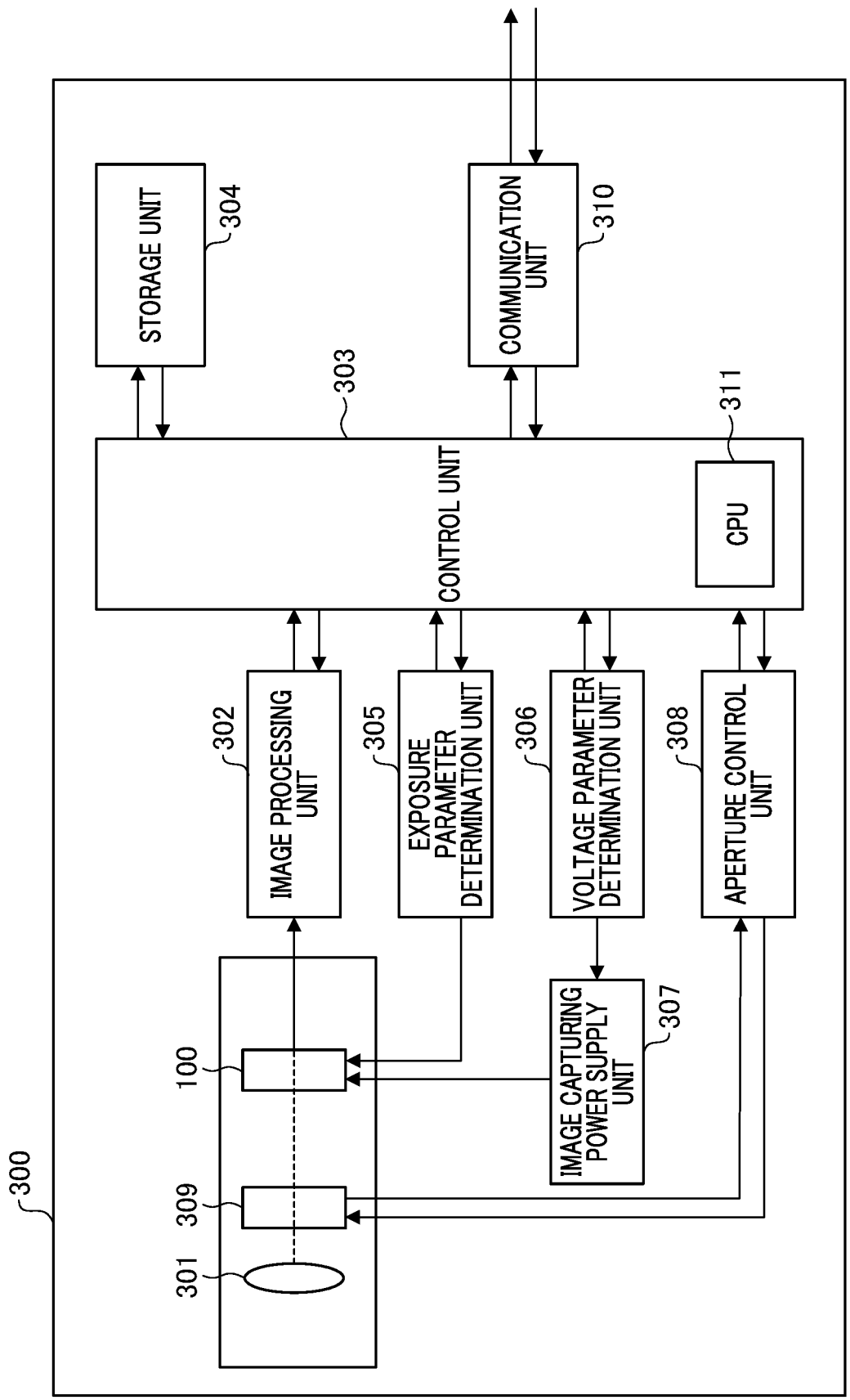
FIG. 6 is a functional block diagram of a photoelectric conversion apparatus according to the First Embodiment.

FIG. 6 is a functional block diagram of a photoelectric conversion apparatus according to the First Embodiment. It should be noted that some of the functional blocks shown in FIG. 6 are realized by causing a CPU 311 or the like, serving as a computer included in the control unit 303, so as to execute a computer program stored in a storage unit 304 serving as a storage medium.

However, some or all of these functional blocks may be realized by hardware. A dedicated circuit (ASIC), a processor (such as a reconfigurable processor or a DSP), or the like can be used as hardware. In addition, each of the functional blocks shown in FIG. 6 do not have to be incorporated into the same housing and may be configured by separate devices that are connected to each other via signal lines.

The photoelectric conversion apparatus 300 functions as an image capturing apparatus and includes the photoelectric conversion element 100, an image forming optical system 301, an image processing unit 302, a control unit 303, the storage unit 304, an exposure parameter determination unit 305, and a voltage parameter determination unit 306. In addition, the photoelectric conversion apparatus 300 includes an image capturing power supply unit 307, an aperture control unit 308, an aperture mechanism 309, a communication unit 310, and the like.

The image forming optical system 301 is configured by a plurality of lenses and a lens barrel member that holds the plurality of lenses. In addition, zoom and focus can be controlled by a drive motor or the like. Furthermore, the image forming optical system 301 may have a configuration that enables the insertion and removal of a filter such as an infrared cut filter that transmits or attenuates specific wavelengths.

The aperture mechanism 309 is a mechanism that reduces the amount of light incident on the photoelectric conversion element 100. The aperture amount is controlled by the aperture control unit 308. It should be noted that the photoelectric conversion element 100 includes, for example, an on-chip color filter with an RGB Bayer array.

The image formed by the imaging optical system 301 is captured by the photoelectric conversion element 100 and is output as digital pixel data by AD conversion. In the image processing unit 302, the pixel data undergoes image generation and correction processing, together with black level correction, gamma curve adjustment, noise reduction, white balance correction, color conversion, data compression, and the like, ultimately resulting in the generation of the final image data.

It should be noted that in the First Embodiment, the data input to the image processing unit 302 is referred to as pixel data, and the data output from the image processing unit 302 is referred to as image data.

In addition, an AE evaluation value for Auto Exposure (AE) is calculated from the image data generated in the image processing unit 302. Based on this AE evaluation value, the aperture, exposure time (image capturing time), and digital gain are adjusted so that the luminance level of the image data is at an appropriate level. In addition, in the image processing unit 302, it is possible to change the brightness of the pixel data output from the photoelectric conversion element 100 by adjusting the digital gain.

The storage unit 304 is a storage medium that can temporarily store and read the image data output by the image processing unit 302. Furthermore, the storage unit 304 is also used as a storage area for the computer program executed by the CPU 311 of the control unit 303 (described below), as well as a storage area for various parameters and as a work area during program execution.

The communication unit 310 converts the image data into a format compliant with communication protocols and then distributes the converted image data to an external apparatus (client apparatus) (not shown). More specifically, the communication unit 310 performs compression encoding processes such as H.264 or H.265.

In addition, the communication unit 310 receives setting commands of various parameters and the like from the external apparatus, outputs these commands to the control unit 303, and simultaneously performs the transmission of responses back to the external apparatus. The external apparatus can issue instructions such as zoom and focus to the photoelectric conversion apparatus 300, and can also receive the images being distributed and display the images enlarged or reduced on the display unit of the external apparatus.

In addition, the photoelectric conversion apparatus 300 can acquire operation and control information from an external apparatus. It should be noted that in the First Embodiment, a system that includes an external device and the 300 photoelectric conversion apparatus is referred to as an image capturing system.

The exposure parameter determination unit 305 determines the exposure parameters of the photoelectric conversion apparatus 300. Exposure parameters in the First Embodiment include at least one of the amount of transition (change) or transition time (number of transitions, transition interval, and transition timing) in at least one of an exposure time (imaging time), a digital gain, and an aperture. Here, the exposure parameter determination unit 305 functions as an exposure control unit that controls the exposure period of the photoelectric conversion element.

The voltage parameter determination unit 306 determines a reverse bias voltage (VR) of the photoelectric conversion element 100. Voltage parameters include a transition amount or a transition time (number of transitions, transition interval, and transition timing) of the reverse bias voltage VR.

The voltage parameter determination unit 306 reflects the determined voltage parameters to the image capturing unit 307. Here, the voltage parameter determination unit 306 functions as a voltage control unit that controls the reverse bias voltage applied to the avalanche photodiode.

The image capturing power supply unit 307 is provided with a circuit for variably controlling the output voltage supplied to the photoelectric conversion element 100. In the First Embodiment, the output voltage can be adjusted by writing to a register of the control IC provided with the image capturing power supply unit 307, but this is not limited thereto. For example, a plurality of power supplies may be provided, and a power supply that supplies power to the photoelectric conversion element 100 may be selectable from among the plurality of power supplies based on a command of the control unit 303.

The aperture control unit 308 controls the aperture mechanism 309 so that the aperture amount becomes the aperture amount determined by the exposure parameter determination unit 305. The control unit 303 incorporates a CPU 311 serving as a computer and integrally controls each constituent element of the photoelectric conversion apparatus 300 by the CPU 311 executing a computer program stored in the storage unit 304 serving as a storage medium. In addition, the control unit 303 performs control of various parameter settings and data transmission/reception instructions.

As described above, in the First Embodiment, the reverse bias voltage that is applied to the avalanche photodiode is changed during the driving of the photoelectric conversion apparatus so as to correct the temperature dependence of the reverse bias voltage, adjust the sensitivity of the avalanche photodiode, and the like.

In addition, in the First Embodiment, a change of the reverse bias voltage is performed by avoiding the exposure period of the avalanche photodiode. This is because if a change of the reverse bias voltage is performed during the exposure period, a change in the sensitivity of the avalanche photodiode corresponding to the amount of change in the reverse bias voltage occurs, and a step difference is generated in the image acquired by the photoelectric conversion apparatus.

Figure 7:
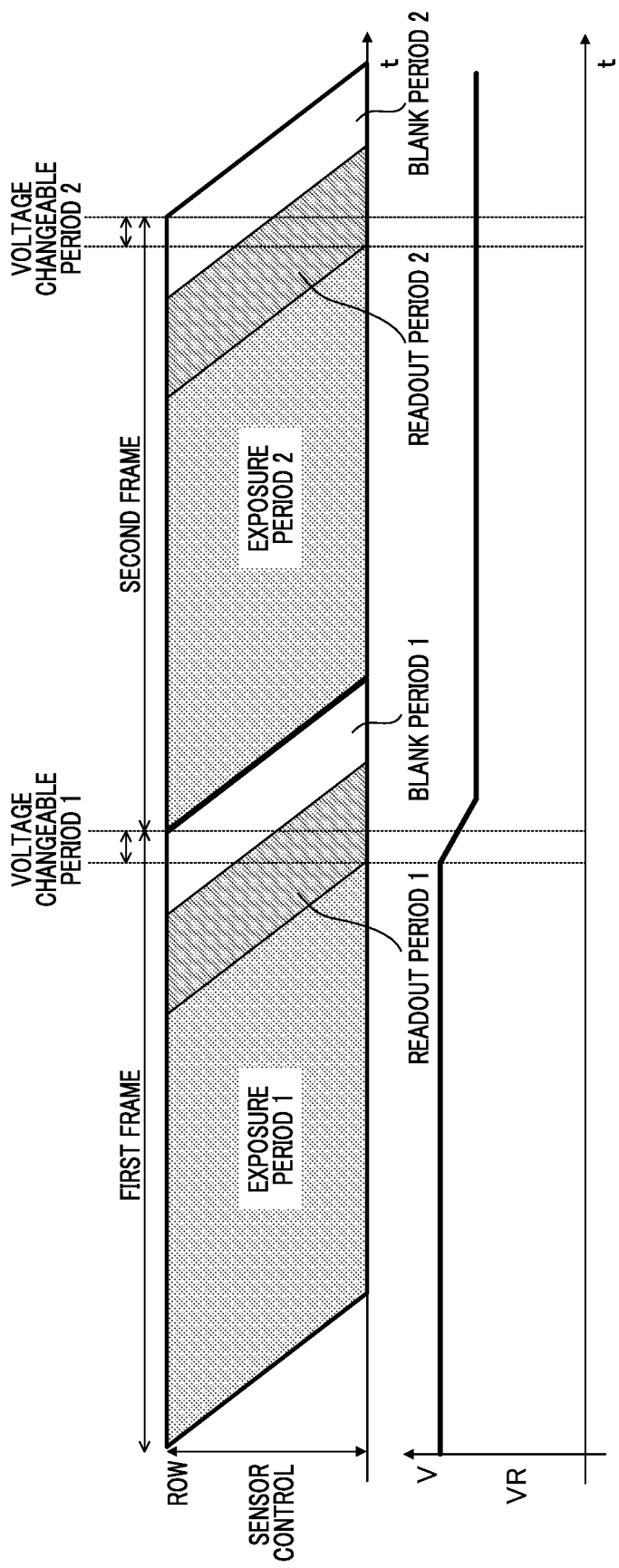
FIG. 7 is an explanatory diagram of a frame configuration before a position change of a blank period according to the First Embodiment.
Figure 8:
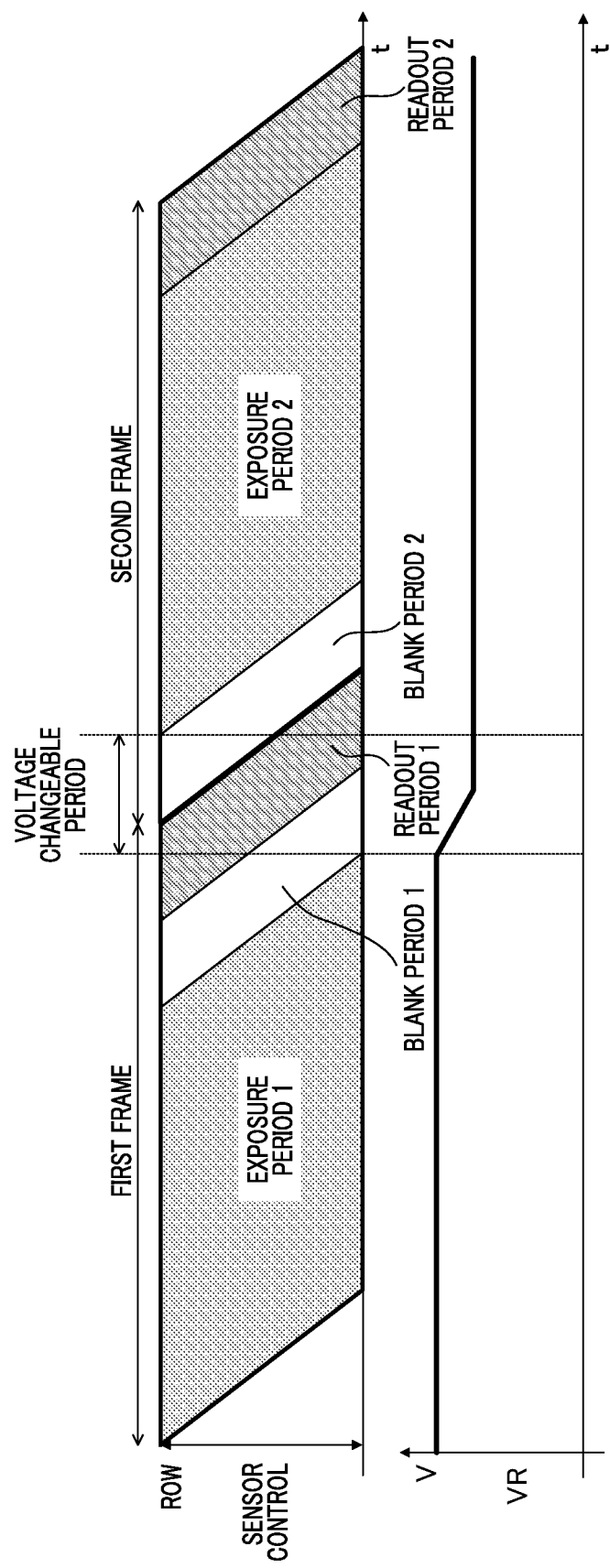
FIG. 8 is an explanatory diagram of a frame configuration after a position change of a blank period according to the First Embodiment.

Referring to FIG. 7 and FIG. 8, an extension operation of a voltage changeable period by changing the position of a blank period (blanking period) will be explained. FIG. 7 is an explanatory diagram of a frame configuration before a position change of a blank period according to the First Embodiment, and FIG. 8 is an explanatory diagram of a frame configuration after a position change of a blank period according to the First Embodiment.

The voltage changeable period is defined as a period in which a step difference does not occur in the image even if the reverse bias voltage of the avalanche photodiode is changed. For this reason, as shown in FIG. 7, in the photoelectric conversion apparatus of the First Embodiment, the period from the end of an exposure period 1 (photoelectric conversion period) of the first frame to the start of an exposure period 2 (photoelectric conversion period) of the second frame is set as a voltage changeable period 1 during which the reverse bias voltage (VR) can be changed.

Because the exposure period (photoelectric conversion period) of the avalanche photodiode is changeable, in a case in which the exposure period is long, the voltage changeable period 1 may become short, or there may be a case in which the voltage changeable period 1 may not exist. In this case, even if the change of the reverse bias voltage is performed from the end of the exposure period 1, the change may not complete within the voltage changeable period 1 and a change in the reverse bias voltage may occur even after the start of the exposure period 2.

In that case, a sensitivity change of the avalanche photodiode occurs in the middle of the exposure period 2, resulting in a step difference generated in the image that was acquired in the second frame.

It should be noted that in the photoelectric conversion apparatus of the First Embodiment, the count value of the photoelectric conversion element can be held in the counter circuit 211 until the counter circuit 211 is reset by the control pulse RES supplied via the drive line 213, and performing the readout of the count value immediately after the end of the exposure period is not necessary.

Therefore, in the First Embodiment, as shown in FIG. 8, the blank periods of two consecutive frame periods (the first frame period and the second frame period) are changed to a position before the exposure period 2, and the bias voltage changeable period is extended. Specifically, the frame configuration of each frame is set in the first frame period as the exposure period 1, a blank period 1, and a readout period 1, and set in the second frame period as a blank period 2, an exposure period 2, and a readout period 2.

That is, in the case shown in FIG. 7, the position of the blank period 2 in the second frame was after the exposure period 2, but as shown in FIG. 8, the position of the blank period 2 in the second frame is shifted so as to be before the exposure period 2.

Thus, the exposure parameter determination unit 305 controls the timing of the blank period 1 of the first frame period and the blank period 2 of the second frame period. Along with this, the position of the blank period 2 within the second frame period is changed to a position after the exposure period or a position before the exposure period.

By changing the position (order) of a blank period, the voltage changeable period in FIG. 8 is extended by the length of the blank period 2 from the voltage changeable period 1 in FIG. 7, which is a conventional frame configuration.

It should be noted that in a case in which the blank period 2 is disposed at the head of a second frame period, the length of the blank period 2 is determined based on the exposure period calculated from the AE evaluation value in the image processing unit 302, the length of the readout period previously stored in the storage unit 304, and the frame rate.

The blank period 2 is disposed from the start of the frame, based on the determined length of the blank period 2. That is, a change of the reverse bias voltage is performed during a period other than the exposure periods in two consecutive frame periods, which is a period that is relatively long in time within the two frame periods. Thus, by extending the changeable period of the reverse bias voltage and avoiding a voltage change in an exposure period, it is possible to suppress the influence on the image due to a reverse bias voltage change of the avalanche photodiode.

Figure 9:
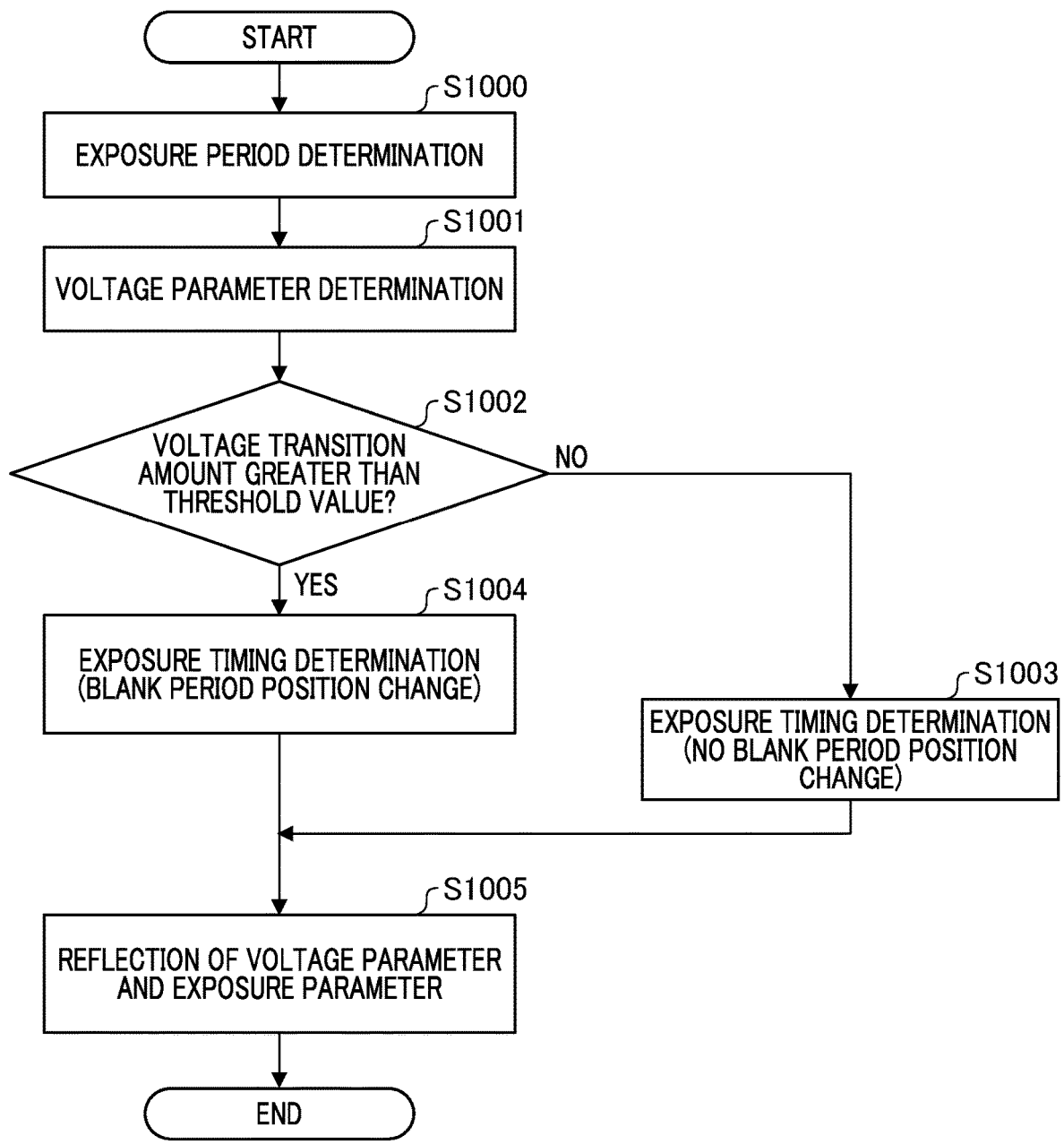
FIG. 9 is a flowchart showing an example of an image capturing method implemented by a control unit 303 according to the First Embodiment.

FIG. 9 is a flowchart showing an example of an image capturing method implemented by a control unit 303 according to the First Embodiment. It should be noted that a CPU or the like serving as a computer within the control unit 303 sequentially performs each step of the flowchart in FIG. 9 by executing the computer program stored in the memory. In addition, the flow of FIG. 9 is executed periodically at a predetermined interval.

In the embodiment shown in FIG. 9, the exposure parameters include an exposure period (photoelectric conversion period) and an exposure timing, and the voltage parameters are considered to include the transition amount of the reverse bias voltage.

First, in step S1000, an exposure period, which is an exposure parameter, is determined. The exposure period is calculated and determined based on the AE evaluation value in the image processing unit 302 in the exposure parameter determination unit 305.

In addition, in step S1001, the voltage parameters are determined. The voltage parameters are determined in the voltage parameter determination unit 306 by performing corrections of the temperature dependency of the reverse bias voltage by a temperature sensor (not shown), and by performing sensitivity adjustments of the avalanche photodiode, and the like.

Next, based on the voltage parameters determined in step S1001, a determination of the transition amount (change amount) of the reverse bias voltage is performed in step S1002. If the transition amount of the reverse bias voltage is greater than a threshold value, the processing proceeds to step S1004. If the transition amount of the reverse bias voltage is equal to or less than the threshold value, the processing proceeds to step S1003.

In step S1003, the exposure timing, which is an exposure parameter, is determined. Because the voltage transition amount is below the threshold value, as shown in FIG. 7, it is possible to secure the voltage changeable period 1 for a predetermined period or longer. Therefore, the position change of the blank period is not performed as shown in FIG. 8, and a normal frame configuration is adopted, as shown in FIG. 7. In addition, in step S1003, the end timing of the exposure period is determined. After step S1003, the processing proceeds to step S1005.

In contrast, in step S1004, the voltage transition amount is equal to or greater than the threshold value, and it is not possible to secure the voltage changeable period for a predetermined period or longer. Therefore, as shown in FIG. 8, the exposure timing, which is an exposure parameter, is determined such that the position of the blank period 2 is arranged before the exposure period 2.

That is, in a case in which the change amount of the reverse bias voltage is equal to or greater than a predetermined threshold value, the position of the blank period 2 is changed to a position before the exposure period within the second frame period. Thus, as shown in FIG. 8, the voltage changeable period, which is the interval between the end of the exposure period 1 and the start of the exposure timing of the exposure period 2 of two consecutive frames, is widened. In addition, in step S1004, the end timing of the exposure period is also determined.

In step S1005, a reflection (change) of the voltage parameter and the exposure parameter is performed. The change of the exposure parameter is controlled by the control unit 303, which includes controlling the frame start timing, and the start and end timings of the exposure period. In addition, the change of the voltage parameter is performed by the control unit 303 during the voltage changeable period as shown in FIG. 7 and FIG. 8.

That is, a change of the reverse bias voltage is performed during a period other than the exposure periods in two consecutive frame periods, which is a period that is relatively long in time within the two frame periods. Thus, it is possible to suppress fluctuations in the brightness of the image due to the transition of the reverse bias voltage.

It should be noted that the above-described step S1005 functions as a voltage control step for controlling the reverse bias voltage applied to the avalanche photodiode of the photoelectric conversion element, and as an exposure control step for controlling the exposure period of the photoelectric conversion element.

It should be noted that, as shown in FIG. 8, in the First Embodiment, the readout period 1 and the readout period 2 after the position change of the blank period are arranged at the end of each frame period. That is, the readout periods are set at the end of each frame period.

By arranging the readout period 1 and the readout period 2 at the end of each frame, as shown in FIG. 8 in the First Embodiment, readouts are performed at a constant interval, regardless of the length and position of the exposure period and the blank period. Thus, as shown in FIG. 8, the image processing unit that receives the output of the photoelectric conversion element can receive signals at a constant frame rate similar to that of FIG. 7 in two consecutive frames after a change of the position of the blank period 2.

A readout, for example, can be provided before or in the middle of the blank period 1, but it is preferable that a readout is provided at the end of each frame period, as shown in FIG. 8, so that the frame rate becomes constant.

The threshold value used in the determination of the voltage transition amount in step S1002 in FIG. 9 will be explained supplementally. A change in the position of the blank period needs only to be performed in a case in which the voltage transition amount is large and a step difference is generated in the image. Thus, the threshold value used in step S1002 is preferably determined from the reverse bias voltage-sensitivity characteristic of the photoelectric conversion element.

In addition, the threshold value is preferably changed according to the digital gain determined by the image processing unit 302 and the brightness of the subject. For example, in a case in which the subject is dark and the luminance is corrected by increasing the digital gain, the sensitivity change of the avalanche photodiode significantly affects the image as compared to a case in which the subject is bright.

That is, in a case in which the subject is dark and the luminance is corrected by increasing the digital gain, the threshold value used in the determination in step S1002 is set to be low. Thus, even in a case in which the transition amount of the reverse bias voltage is small and the sensitivity change is small, a change in the blank period position is performed. Therefore, even in a case in which the step difference in the image is prominent, an appropriate change in the position of the blank period is performed, and it is possible to suppress the effect of the step difference on the image.

Figure 10:
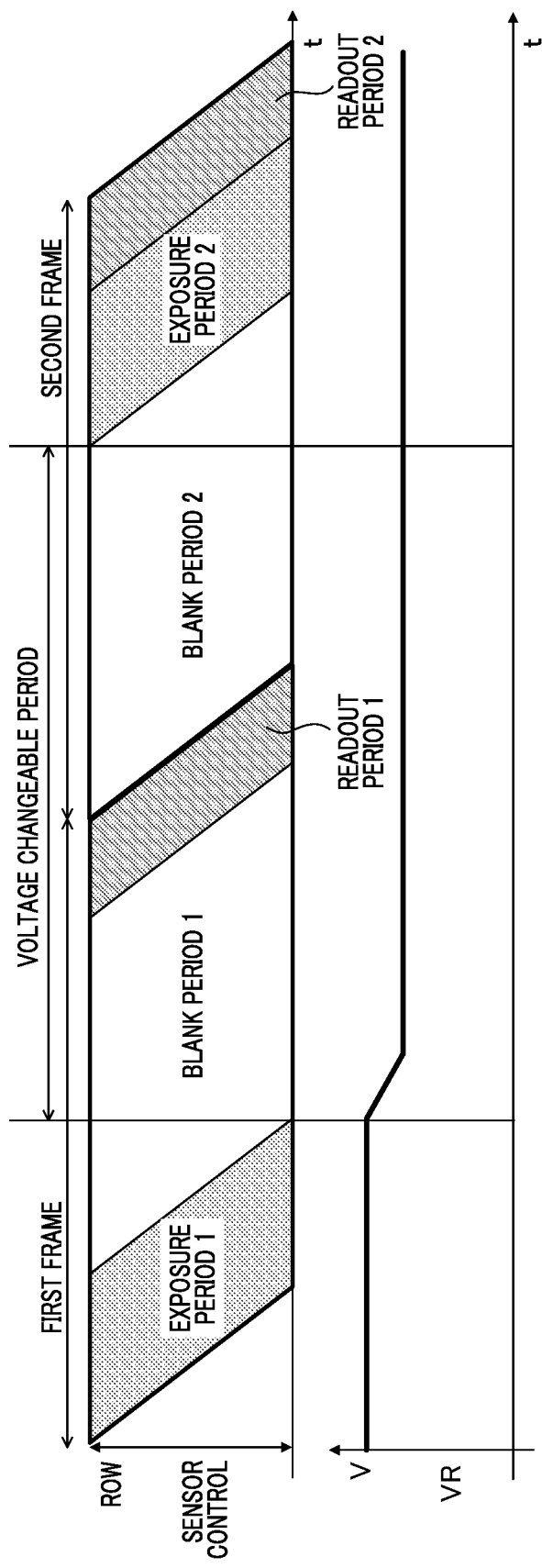
FIG. 10 is an explanatory diagram of a frame configuration in the case of a short-time exposure according to the First Embodiment.

In addition, a method of changing a blank period in a case in which the exposure period is short will be explained supplementally with reference to FIG. 10. FIG. 10 is an explanatory diagram of a frame configuration in the case of a short-time exposure according to the First Embodiment. As shown in FIG. 10, in a case in which the exposure period is shorter than a predetermined period, if a position change of a blank period is performed as shown in FIG. 8, the timing of the exposure period within a frame will differ significantly from frame to frame.

For example, in FIG. 10, in the first frame, the exposure period 1 starts simultaneously with the start of the first frame, whereas in the second frame, the exposure period 2 starts in the middle of the second frame.

In the case of a short-time exposure and the performing of a blank period position change, the timing of the exposure period between the preceding and subsequent frames differs significantly, and in a case in which an image of a moving body is captured, the motion of the moving body will appear discontinuous. Therefore, in a case in which the exposure period is short and a voltage changeable period can be sufficiently secured, it is preferable not to perform a position change of the blank period even in a case in which the voltage transition is greater than the threshold value in step S1002.

Alternatively, instead of determining in step S1002 as to whether or not the voltage transition amount is greater than the threshold value, whether or not the exposure period is longer than a predetermined period may be determined in step S1002. Then, in a case in which the exposure period in step S1002 is longer than the predetermined period (a voltage changeable period cannot be sufficiently secured), the processing proceeds to step S1003, and in a case in which the exposure period in step S1002 is equal to or less than the predetermined period, the processing proceeds to step S1004.

Second Embodiment

In the First Embodiment, at the time of the reverse bias voltage change of the avalanche photodiode, the presence or absence of a position change of a blank period was determined based on the transition amount of the reverse bias voltage. In a Second Embodiment, a determination of the presence or absence of a position change of a blank period is performed according to the length of the blank period and the transition amount of the reverse bias voltage.

Figure 11:
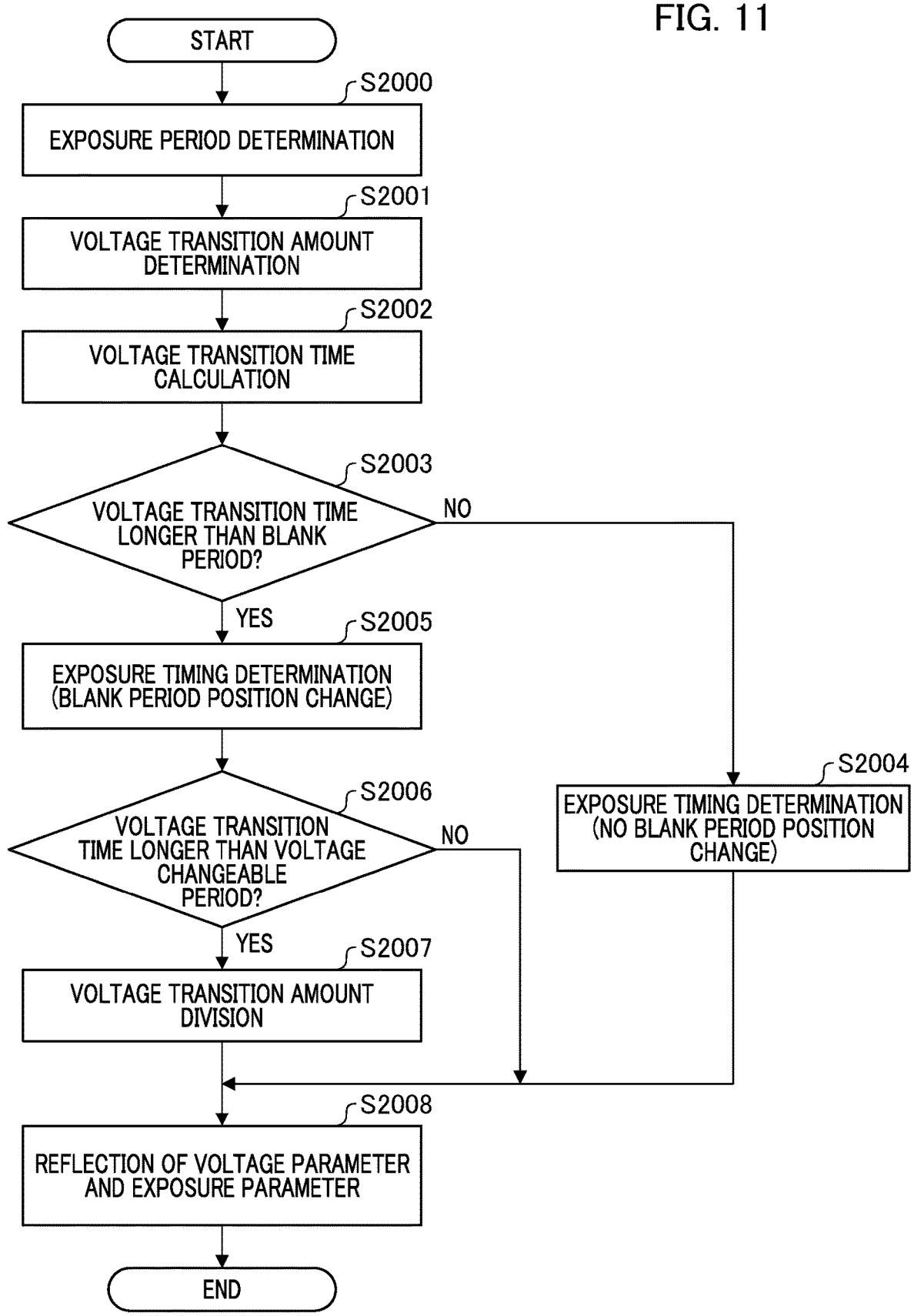
FIG. 11 is a flowchart of the blank period change control implemented by the control unit 303 according to a Second Embodiment.

FIG. 11 is a flowchart of the blank period change control implemented by the control unit 303 according to a Second Embodiment. It should be noted that a CPU or the like serving as a computer in the control unit 303 sequentially performs each step of the flowchart in FIG. 9 by executing a computer program stored in the memory. In addition, the flow of FIG. 11 is executed periodically at a predetermined interval.

In the Second Embodiment, the exposure parameters are defined as the exposure period and exposure timing, and the voltage parameters are defined as the transition amount and transition time of the reverse bias voltage.

First, in step S2000, an exposure period, which is an exposure parameter, is determined. In the exposure parameter determination unit 305, the exposure period is calculated and determined based on the AE evaluation value in the image processing unit 302.

In step S2001, the voltage transition amount, which is a voltage parameter, is determined. The voltage transition amount is determined in the voltage parameter determination unit 306 by performing corrections of the temperature dependency of the reverse bias voltage by a temperature sensor (not shown), and by performing sensitivity adjustments of the avalanche photodiode and the like.

In step S2002, the voltage transition time of the reverse bias voltage, which is a voltage parameter, is calculated based on the transition amount of the reverse bias voltage that was determined in step S2001.

In step S2003, a length determination of the voltage transition time of the reverse bias voltage is performed based on the exposure parameters determined in step S2000 and the voltage parameters determined in step S2002.

That is, in step S2003, if the voltage transition time is determined to be longer than the blank period 1, the processing proceeds to step S2005. In step S2003, if the voltage transition time is determined to be equal to or less than blank period 1, the processing proceeds to step S2004 and determines the exposure timing, assuming that there is no position change of the blank period 2.

That is, in step S2004, when determining the exposure timing, which is an exposure parameter, because the voltage transition time is equal to or less than a predetermined blank period and a sufficient voltage changeable period can be secured, a position change of the blank period 2 is not performed. Thus, in a case in which the change time of the reverse bias voltage is less than or equal to the blank period 1, the position change in the blank period 2 is not performed.

In step S2005, along with determining the exposure timing, which is an exposure parameter, the position of the blank period 2 is changed because the voltage transition time is longer than the blank period 1 and a sufficient voltage changeable period cannot be secured.

That is, a position change of the blank period 2 is performed in a case in which the length of the blank period 1 is equal to or less than a predetermined first threshold value. Then, as shown in FIG. 8, the exposure timing of the exposure period 1 and the exposure period 2 of two consecutive frames is determined. In addition, in step S2005, the end timing of an exposure period is also determined.

In step S2006, it is determined as to whether or not the voltage transition time is longer than the voltage changeable period after the position change of the blank period 2. In a case in which the voltage transition time is longer than the voltage changeable period after the position change of the blank period 2, the processing proceeds to step S2007. In a case in which the voltage transition time is equal to or less than the voltage changeable period after the position change of the blank period 2, the processing proceeds to step S2008.

In step S2007, the voltage transition amount, which is a voltage parameter, is divided. In step S2001, the voltage transition amount, which is a voltage parameter, is divided into a voltage transition amount that becomes a voltage transition time approximately the same length as the voltage changeable period after the position change of the blank period 2, and the remaining voltage transition amount.

In step S2007, the current voltage transition amount is set as a voltage transition amount that becomes a voltage transition time of the same length as the voltage changeable period after the position change of blank period 2, and the voltage transition amount other than this is carried over to the flow of FIG. 11 in the next cycle.

That is, in a case in which the change time of the reverse bias voltage is longer than a predetermined period (voltage changeable period), the change amount of the reverse bias voltage is limited to a changeable change amount within the predetermined period (voltage changeable period). Then, any change amount equal to or greater than the changeable change amount within the predetermined period is changed at the time of the next voltage change.

In step S2008, a reflection (change) of the voltage parameters and the exposure parameters is performed. A change of the exposure parameters is controlled by the control unit 303 at the frame start time. In addition, a change of the voltage parameters is performed by the control unit 303 during the voltage changeable period, as shown in FIG. 8.

Thus, it is possible to suppress changes in the brightness of the image due to the transition of the reverse bias voltage. In addition, even in a case in which the voltage transition time is longer than the voltage changeable period after the position change of the blank period 2, the influence on the image can be suppressed.

A calculation method of the voltage transition time of the reverse bias voltage in step S2002 in FIG. 11 will be explained. The voltage transition time as a first threshold value is preferably determined based on the throughput (response speed) of the image capturing power supply unit 307 serving as a voltage control unit. For example, if the transition amount of the reverse bias voltage determined in step S2001 is set at 0.5V, and the throughput of the image capturing power supply unit 307 is 0.2 V/ms, then the voltage transition time becomes 2.5 ms.

At the startup of the photoelectric conversion apparatus, such as when driving a temperature control module such as a heater/cooler, in a case in which the temperature gradient is large and the transition amount of the reverse bias voltage becomes large, a modification may be made to lengthen the blank period.

For example, the time from the startup of the photoelectric conversion apparatus to the end of the temperature change of the photoelectric conversion element is stored, the temperature change is detected by a temperature sensor (not shown), and the blank period is lengthened in a case in which the temperature change is large.

In addition, at the time of the temperature control module operation, control such as performing a change of the blank period synchronously with the operation of the temperature control module and according to the temperature may be performed. In this manner, it is possible to suppress the influence on the image even in a case in which the temperature gradient is large and the transition amount of the reverse bias voltage becomes large.

Third Embodiment

In the First Embodiment and the Second Embodiment, a change of the reverse bias voltage in a case in which an image is output for each frame was explained. In a Third Embodiment, a change of the reverse bias voltage in a case in which long-time and short-time exposure is performed in two consecutive frames and acquiring an image with a wide dynamic range by performing image composition (HDR composition or WDR composition) will be explained.

Figure 12:
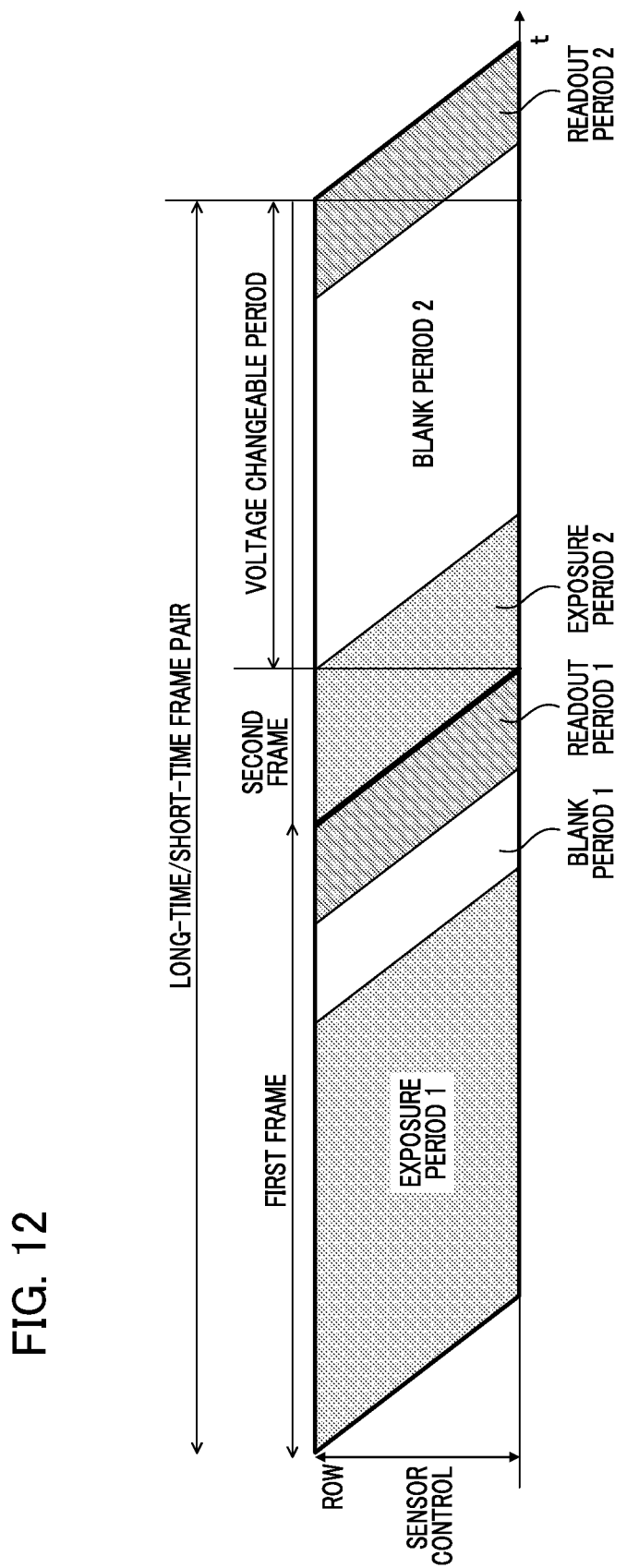
FIG. 12 is a diagram for explaining a frame configuration example in a case of performing long-time exposure and short-time exposure image composition according to a Third Embodiment.

FIG. 12 is a diagram for explaining a frame configuration example in a case of performing long-time exposure and short-time exposure image composition according to a Third Embodiment. In the Third Embodiment, in a case in which image composition is performed in two consecutive frames, the arrangement of the long-time frames and short-time frames is prioritized without changing the order of the blank period 2, and a voltage changeable period is secured.

As shown in FIG. 12, an exposure period 1, which is a long-time exposure, and an exposure period 2, which is a short-time exposure, are provided, and these are set as one pair. As shown in FIG. 12, by arranging a long-time exposure at the beginning of the first frame and a short-time exposure at the beginning of the second frame, a blank period 2, which is a relatively long blank period, is provided after the exposure of the long-time and short-time frame pair has ended.

That is, in a case in which the exposure period 1 of the first frame period is longer than the exposure period 2 of the second frame period, the change of the reverse bias voltage is performed after the exposure period 2 of the second frame period. Thus, it is possible to set the interval between the long-time exposure and the short-time exposure to approximately one frame period, and it is also possible to secure a long voltage changeable period. Therefore, it is possible to suppress the influence on the image due to the change of the reverse bias voltage of the avalanche photodiode.

Furthermore, by providing a composition unit (not shown) for composing the image photoelectrically converted during the exposure period 1 of the first frame period and the image photoelectrically converted during the exposure period 2 of the second frame period, it is possible to obtain a composite image having a wide dynamic range. In addition, because image capturing can be performed with the same reverse bias voltage, that is, with the same sensitivity, in the frame pair in which image composition is performed, the image quality of the composed image improves.

It should be noted that in the above embodiments, in a case in which the subject illumination is relatively high or in a case in which the exposure period is shorter than a predetermined period, because the step difference caused by the change in reverse bias voltage is not noticeable, it is not necessary to change the position of the blank period 2 to the first position of the frame period 2. In addition, even in a case in which the output frequency of the image is lower than the driving frequency of the photoelectric conversion element, it is not necessary to change the position of the blank period 2 to the first position of the frame period 2.

It should be noted that in the above-described embodiments, because there is a possibility that the S/N will deteriorate due to an increase in sensitivity by reverse bias voltage control, it is preferable to prioritize controls such as aperture control, exposure time control, and removal of an ND (Neutral Density) filter, and then to perform the reverse bias voltage control.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image capturing apparatus through a network or various storage media. Then, a computer (or a CPU, an MPU, or the like) of the image capturing apparatus may be configured to read and execute the program. In such a case, the program and the storage medium storing the program configure the present invention.

Furthermore, the present invention includes, for example, at least one processor or circuit configured to perform the functions of the embodiments described above. It should be noted that a plurality of processors may be used to implement distributed processing.

This application claims the benefit of Japanese Patent Application No. 2023-029139, filed on Feb. 28, 2023, which is hereby incorporated by reference herein in its entirety.

What is claimed is:

1. An image capturing apparatus comprising a photoelectric conversion element configured to include an avalanche photodiode, at least one processor; and a memory coupled to the at least one processor, the memory storing instructions that, when executed by the at least one processor, cause the at least one processor to perform:
   voltage control that controls a reverse bias voltage applied to the avalanche photodiode, and
   exposure control that controls an exposure period of the photoelectric conversion element,
   wherein the voltage control is configured to perform a change of the reverse bias voltage during a predetermined period other than exposure periods in two consecutive frame periods, wherein the predetermined period is set by changing a blank period within two consecutive frame periods, wherein the two frame periods consist of a first frame period and a second frame period, wherein the exposure control is further configured to control the timing of a blank period of the first frame period and a blank period of the second frame period, and wherein the exposure control is further configured to change the position of the blank period of the second frame period to a position after the exposure period within the second frame period or a position before the exposure period of the second frame period.

2. The image capturing apparatus according to claim 1, wherein the exposure control is further configured to change the position of the blank period of the second frame period to a position before the exposure period within the second frame period in a case in which the change amount of the reverse bias voltage is equal to or greater than a predetermined threshold value.

3. The image capturing apparatus according to claim 1, wherein the exposure control is further configured to set a readout period at the end of each frame period.

4. The image capturing apparatus according to claim 1, wherein the exposure control does not perform a position change of the blank period of the second frame period in a case in which the change time of the reverse bias voltage is equal to or less than the blank period of the first frame period.

5. The image capturing apparatus according to claim 1, wherein the exposure control is further configured to limit the change amount of the reverse bias voltage in a case in which the change time of the reverse bias voltage is longer than a predetermined period.

6. The image capturing apparatus according to claim 5, wherein the exposure control is further configured to limit the change amount of the reverse bias voltage to a change amount that is changeable within the predetermined period in a case in which the change time of the reverse bias voltage is longer than a predetermined period.

7. The image capturing apparatus according to claim 6, wherein the exposure control changes, at the time of the next voltage change, a change amount that is equal to or greater than the change amount that is changeable within the predetermined period.

8. The image capturing apparatus according to claim 1, wherein the voltage control is further configured to perform a change of the reverse bias voltage after the exposure period of the second frame period, in a case in which the exposure period of the first frame period is longer than the exposure period of the second frame period.

9. The image capturing apparatus according to claim 8, wherein the memory storing further instructions that, when executed by the at least one processor, cause the at least one processor to compose an image photoelectrically converted during the exposure period of the first frame period and an image photoelectrically converted during the exposure period of the second frame period.

10. An image capturing apparatus comprising a photoelectric conversion element configured to include an avalanche photodiode, at least one processor; and a memory coupled to the at least one processor, the memory storing instructions that, when executed by the at least one processor, cause the at least one processor to perform:

voltage control that controls a reverse bias voltage applied to the avalanche photodiode, and exposure control that controls an exposure period of the photoelectric conversion element, wherein the voltage control is configured to perform a change of the reverse bias voltage during a predetermined period other than the exposure periods in two consecutive frame periods, wherein the predetermined period is set by changing a blank period within two consecutive frame periods, wherein the two frame periods consist of a first frame period and a second frame period, wherein the exposure control is further configured to control the timing of a blank period of the first frame period and a blank period of the second frame period, and wherein the exposure control is further configured to perform a position change of the blank period of the second frame period in a case in which the length of the blank period of the first frame period is equal to or less than a predetermined first threshold value.

11. The image capturing apparatus according to claim 10, wherein the first threshold value is determined based on the throughput of the voltage control.

12. An image capturing method comprising:

voltage controlling that controls reverse bias voltage applied to an avalanche photodiode of a photoelectric conversion element; and exposure controlling that controls an exposure period of the photoelectric conversion element, wherein the voltage controlling is configured to perform a change of the reverse bias voltage during a predetermined period other than exposure periods in two consecutive frame periods, wherein the predetermined period is set by changing a blank period within two consecutive frame periods, wherein the two frame periods consist of a first frame period and a second frame period, wherein the exposure controlling is further configured to control the timing of a blank period of the first frame period and a blank period of the second frame period, and wherein the exposure controlling is further configured to change the position of the blank period of the second frame period to a position after the exposure period within the second frame period or a position before the exposure period of the second frame period.

* * * * *